(No Model.)
W. FANCKBONER.
BARREL SWING AND TRUCK.
No. 267,744. Patented Nov. 21, 1882.
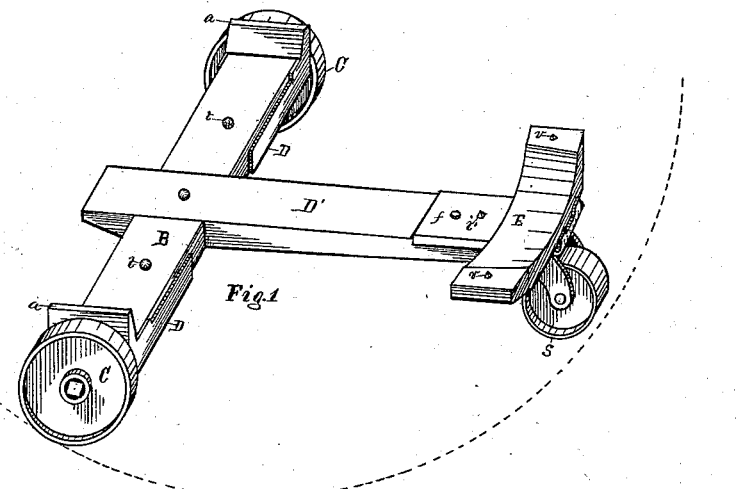
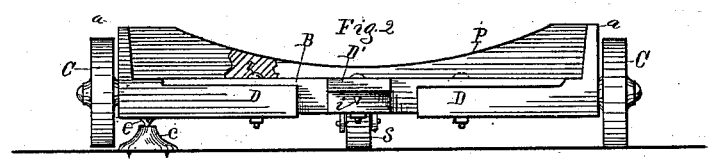
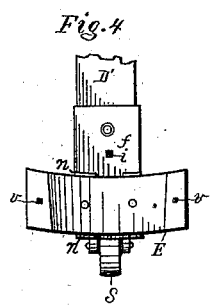
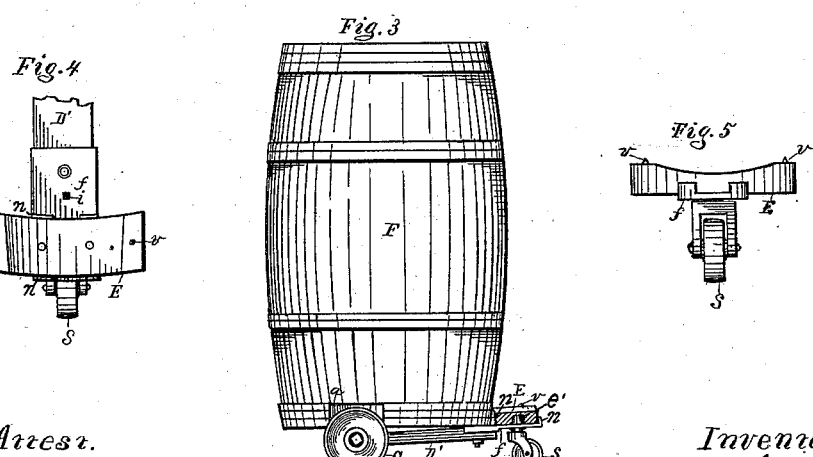
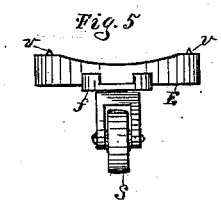
Attest.
John C. Perkins
Frank C. Gibbs
Inventor.
Wm Fanckboner
By Lucius C. West
Atty.

UNITED STATES PATENT OFFICE.

WILLIAM FANCKBONER, OF SCHOOLCRAFT, MICHIGAN.

BARREL SWING AND TRUCK.

SPECIFICATION forming part of Letters Patent No. 267,744, dated November 21, 1882.

Application filed May 18, 1882. (No model.)

*To all whom it may concern:*

Be it known that I, WILLIAM FANCKBONER, a citizen of the United States, residing at Schoolcraft, county of Kalamazoo, State of Michigan, have invented a new and useful Barrel Swing and Truck, of which the following is a specification.

The object of my invention is to construct a simple and cheap device which may be used as a swing, a truck, or both, in handling barrels, boxes, &c., and having certain new and useful improvements, set forth in the following description.

In the drawings, Figure 1 is a perspective view of the truck; Fig. 2, rear elevation, showing the truck converted into a swing; Fig. 3, side elevation with barrel mounted; Fig. 4, top view of the forward end; and Fig. 5, end view of same, looking from the right of Fig. 1.

The frame of the device resembles a cross, consisting of the axle-beam B and the caster-beam D′, secured to the center of axle-beam B, and extending forward at right angles thereto. The rear extension of beam D′ is beveled on the under side, and provided with a spur, $i$, Fig. 2, which prevents the truck from slipping when this end is tipped down to catch it under a barrel in loading the same. Beam B is provided with castings D, with which the wheels C are connected, and are formed with guard-supports $a\ a$, adapted to protect the sides and periphery of the wheels from contact with the load, as hereinafter explained.

$t\ t$ are bolts securing castings D D to beam B.

$f$ is a casting secured to the forward end of beam D′. This casting has a center projection, $e′$, Fig. 3, receiving the pintle of the caster-wheel $s$. It also has lugs $n\ n$, between which a bolster, E, is located, the same being bolted to said casting $f$, Fig. 4. This bolster is hollowed out to receive the round form of a barrel when laid upon its side.

$r\ r$ are spurs secured to the ends of bolster E for the purpose of preventing a box from slipping when located on said ends and on top of the guard-supports $a\ a$. When a barrel is placed on the device endwise, as in Fig. 3, the chine comes inside of bolster E or lugs $n\ n$ and the guard-supports $a\ a$. Thus the uses of the guard-supports are shown.

$e$ is a tapered projection on the under side of one end of the axle-beam B. When using the truck as a barrel-swing, I locate this projection in a hollow recess of support $c$, provided for the purpose, which raises said end of beam B with its wheel clear of the floor, and forms a fulcrum pivot, on which and the one wheel, C, and caster S, engaging the floor, the device may be swung around, as indicated by dotted lines in Fig. 1. This use of the truck is desirable in locating barrels under a store-counter with a truck under them, as they can be readily swung out to obtain access to the barrel; and if it is desired to move the barrel to another location it can be done by throwing the truck off from the fulcrum-support $c$; also, this use of the truck is very convenient in turning a heavy burden around in moving it from one point to another.

In Fig. 2 a detachable bolster, P, is shown, located between the guard-supports $a\ a$, to be used when moving barrels located on the truck sidewise. The upper face of this bolster P is hollowed similar to bolster E, and for the same purpose. This bolster is kept in place by forming little hollow mortises in its under side, which receive the heads of the bolts $t\ t$.

Having thus described my invention, what I claim as new is—

1. The device consisting of the axle-beam, provided with the castings and wheels, said castings provided with the guard-supports, the caster-beam provided with the caster at the forward end, and the bolster above said caster, all substantially as set forth.

2. The barrel and box truck consisting of the axle-beam with castings having the guard-supports, said castings being secured to the axle-beam by the bolts, the caster-beam shown with its caster, said truck provided with transporting-wheels, in combination with the detachable bolster, substantially as described.

3. In a barrel and box truck, the T-shaped frame having the rear end of the caster-beam beveled on the under side, and provided with the spur, for the object specified.

4. The truck-frame provided with the casting, having means for supporting the caster-wheel and bolster, all substantially as set forth.

5. The combination, with the truck-frame having the guard-supports, of the detachable bolster adapted to fit between said guard-supports and provided with the mortises on the under side to receive the projecting means for holding said bolster in place, substantially as described.

6. The combination, with the truck provided with the wheels and caster, and a projection on the under side of one end of the axle-beam, of a fulcrum-support adapted to receive said projection, for the object stated, all substantially as described.

WILLIAM FANCKBONER.

Witnesses:
C. PELGRIM,
G. T. PELGRIM.